United States Patent
Judenhahn et al.

(10) Patent No.: US 11,440,601 B2
(45) Date of Patent: Sep. 13, 2022

(54) MOTOR VEHICLE AND METHOD FOR OPERATING A MOTOR VEHICLE

(71) Applicant: Daimler AG, Stuttgart (DE)

(72) Inventors: Wolfram Judenhahn, Leutenbach (DE); Matthijs Ravestein, Boeblingen (DE); Jochen Bisinger, Esslingen (DE)

(73) Assignee: Daimler AG, Stuttgart (DE)

( * ) Notice: Subject to any disclaimer, the term of this patent is extended or adjusted under 35 U.S.C. 154(b) by 145 days.

(21) Appl. No.: 16/767,542

(22) PCT Filed: Sep. 18, 2018

(86) PCT No.: PCT/EP2018/075128
§ 371 (c)(1),
(2) Date: May 27, 2020

(87) PCT Pub. No.: WO2019/105626
PCT Pub. Date: Jun. 6, 2019

(65) Prior Publication Data
US 2020/0339202 A1  Oct. 29, 2020

(30) Foreign Application Priority Data

Nov. 28, 2017 (DE) ............. 10 2017 010 996.6

(51) Int. Cl.
*B62D 61/00* (2006.01)
*B62D 31/00* (2006.01)
(Continued)

(52) U.S. Cl.
CPC ............ *B62D 61/00* (2013.01); *B62D 31/003* (2013.01); *B62D 37/06* (2013.01); *B62D 51/02* (2013.01)

(58) Field of Classification Search
CPC ...................................................... B62D 61/00
(Continued)

(56) References Cited

U.S. PATENT DOCUMENTS

| 584,127 A | * | 6/1897 | Draullette et al. ..... B62D 11/08 |
| | | | 180/6.2 |
| 2,372,043 A | * | 3/1945 | Aghnides .................. F41H 7/02 |
| | | | 180/6.44 |

(Continued)

FOREIGN PATENT DOCUMENTS

| CN | 2487631 Y | 4/2002 |
| CN | 101698420 A | 4/2010 |

(Continued)

OTHER PUBLICATIONS

PCT/EP2018/075128, International Search Report dated Dec. 19, 2018 (Two (2) pages).

(Continued)

*Primary Examiner* — Kevin Hurley
(74) *Attorney, Agent, or Firm* — Crowell & Moring LLP

(57) ABSTRACT

A motor vehicle having a vehicle body with a passenger compartment, a chassis supporting the vehicle body, a vehicle axle which can be driven by a drive device, and a seat device which is arranged inside the passenger compartment and is rotatable relative to the passenger compartment about an axis of rotation. The chassis supporting the vehicle body has only one vehicle axle, about the axis of which, the vehicle body with the passenger compartment and the seat device arranged inside the passenger compartment are rotatable relative to each other.

9 Claims, 2 Drawing Sheets

(51) Int. Cl.
*B62D 37/06* (2006.01)
*B62D 51/02* (2006.01)

(58) Field of Classification Search
USPC .......................................................... 180/218
See application file for complete search history.

(56) References Cited

U.S. PATENT DOCUMENTS

| | | | | |
|---|---|---|---|---|
| 2,909,145 | A * | 10/1959 | De Hertelendy | B62D 57/04 180/218 |
| 3,183,020 | A * | 5/1965 | Hawver | B62K 17/00 280/208 |
| 3,313,365 | A * | 4/1967 | Jackson | B62D 37/04 180/6.2 |
| 3,893,707 | A * | 7/1975 | Samsel | B62M 1/14 280/208 |
| 4,163,567 | A * | 8/1979 | Barber | A63B 19/02 180/218 |
| 4,192,395 | A * | 3/1980 | Barber | A63B 19/02 180/218 |
| 5,366,034 | A * | 11/1994 | Meyers | B62D 39/00 180/10 |
| 6,298,934 | B1 | 10/2001 | Shteingold | |
| 6,752,231 | B2 * | 6/2004 | Hume | B62D 61/00 180/218 |
| 7,188,694 | B1 * | 3/2007 | Blair | B60B 19/06 180/218 |
| 8,490,723 | B2 * | 7/2013 | Heinzmann | B60L 58/12 180/7.1 |
| 10,875,370 | B2 * | 12/2020 | De Francesco | B63H 1/04 |
| 2005/0072616 | A1 * | 4/2005 | Pal | B60K 7/0007 180/218 |

FOREIGN PATENT DOCUMENTS

| | | | |
|---|---|---|---|
| CN | 102069874 A | 5/2011 | |
| CN | 103318291 A | 9/2013 | |
| DE | 3626322 A1 * | 2/1988 | ........... B60K 17/043 |
| DE | 10 2015 004 228 A1 | 10/2016 | |
| GB | 666549 | 2/1952 | |
| WO | WO 2004/028888 A1 | 4/2004 | |
| WO | WO 2010/031093 A1 | 3/2010 | |
| WO | WO 2011/032368 A1 | 3/2011 | |
| WO | WO 2014/145878 A1 | 9/2014 | |
| WO | WO 2017/119805 A2 | 7/2017 | |

OTHER PUBLICATIONS

Chinese Office Action issued in Chinese application No. 201880076728.9 dated Nov. 25, 2021, with partial English translation (Ten (10) pages).

Chinese Office Action issued in Chinese application No. 201880076728.9 dated May 23, 2022, with partial English translation (Eight (8) pages).

* cited by examiner

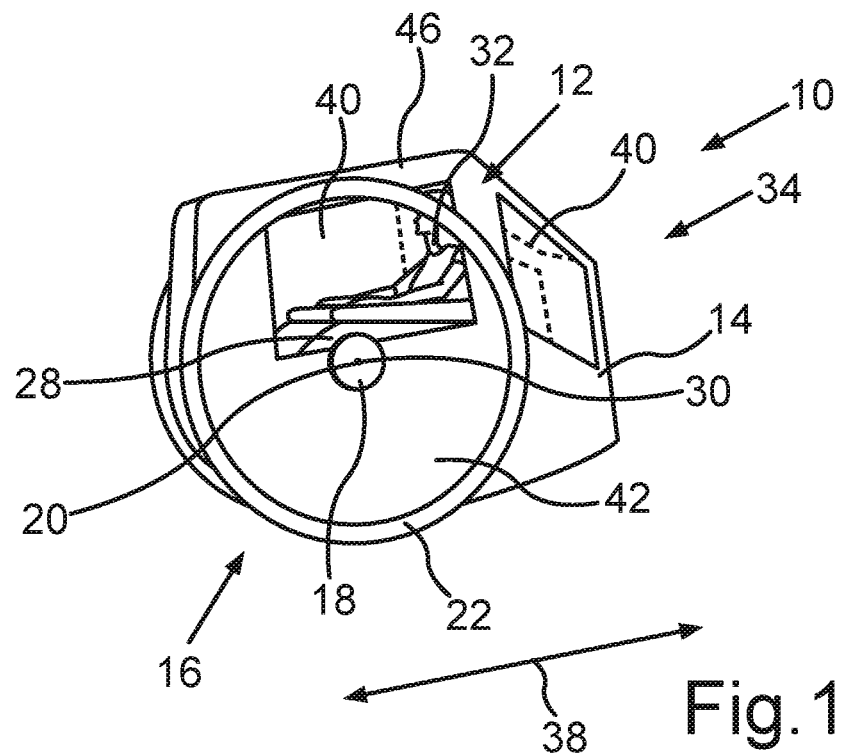
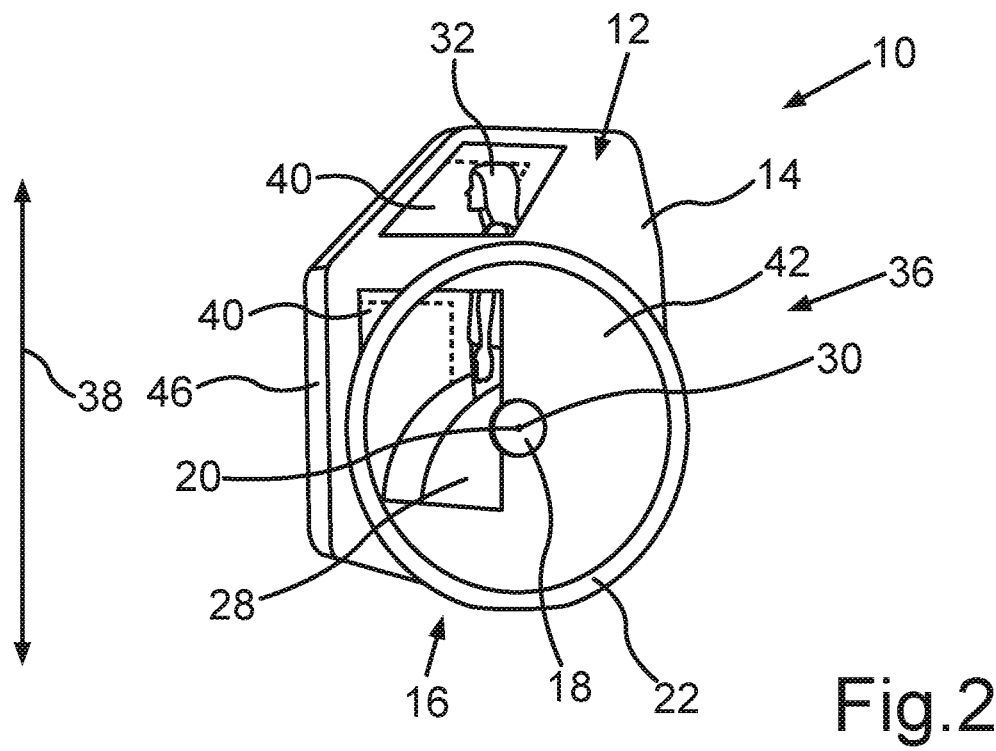

MOTOR VEHICLE AND METHOD FOR OPERATING A MOTOR VEHICLE

BACKGROUND AND SUMMARY OF THE INVENTION

The invention relates to a motor vehicle and a method for operating a motor vehicle.

Such a motor vehicle is already known from CN 103318291 A. This motor vehicle comprises a vehicle cabin module having a spherical vehicle cabin. The spherical vehicle cabin can be oriented independently of the orientation of the motor vehicle in such a way that a driver or vehicle occupant arranged in the spherical vehicle cabin is always oriented with his or her head upwards relative to the horizontal.

In addition, a three-wheeled vehicle is known from WO 2014/145878 A1, the height of which can be adjusted depending on the speed of the vehicle. When the height is adjusted, a vehicle body of the motor vehicle can be tilted about a tilting axis by changing the position of at least one of the wheels relative to the vehicle body and thus be adjusted relative to the horizontal, or its orientation can be adjusted to the horizontal. In this case, a seat device is firmly connected to the vehicle body such that the seat device is oriented together with the vehicle body relative to the horizontal.

The object of the present invention is to create a motor vehicle and a method for operating a motor vehicle by means of which a vehicle occupant can stay particularly comfortably in different positions in a passenger compartment of the motor vehicle.

A first aspect of the invention concerns a motor vehicle with a vehicle body having a passenger compartment. The motor vehicle further comprises a chassis supporting the vehicle body and having a vehicle axle drivable by means of a drive device. Furthermore, the motor vehicle has a seat device which is arranged within the passenger compartment and is rotatable about an axis of rotation relative to the passenger compartment. In order to enable a vehicle occupant to be able to arrange himself/herself particularly comfortably in different positions within the passenger compartment, it is provided in accordance with the invention that the chassis supporting the vehicle body has only one vehicle axle, about the axis of which the vehicle body with a passenger compartment and the seat device arranged within the passenger compartment are rotatable relative to each other. In other words, the passenger compartment is rotatable about the axis relative to the chassis and the seat device is rotatable about the axis relative to the chassis and relative to the passenger compartment. Thus the axis of rotation about which the seat device is rotatable relative to the passenger compartment corresponds to the axis of the vehicle axle. By way of example, the drive device comprises at least one electric motor, in particular one electric motor per wheel of the chassis. By way of example, the motor vehicle has two wheels, each of which can be driven by an electric motor. The two electric motors lie on the axis and can be rotated relative to the chassis, for example. In particular, the electric motors are non-rotatably connected to the seat device or to the passenger compartment and serve to drive the wheels of the chassis. In particular, the passenger compartment can be designed to be elongated, wherein the passenger compartment can be aligned with its longitudinal direction of extension parallel to a vehicle vertical direction or parallel to a vehicle longitudinal direction of extension and thus perpendicular to the axis. If the passenger compartment is arranged with its longitudinal direction of extension vertical, the vehicle occupant can stay standing inside the passenger compartment particularly advantageously. If the passenger compartment is arranged with its longitudinal direction of extension horizontal, the vehicle occupant can sit particularly comfortably inside the passenger compartment in the case of particularly advantageous aerodynamics of the motor vehicle. Here, the motor vehicle can in particular be operated autonomously.

In an advantageous design of the invention, it is provided that the passenger compartment can be arranged in at least two different basic positions by at least temporarily fixing the vehicle body to the vehicle axle, while the seat device can be rotated relative to the passenger compartment. In other words, the vehicle body can be synchronized with the vehicle axle such that the vehicle body is temporarily rotated with the vehicle axle during synchronization. This allows the passenger compartment to be positioned in at least two different basic positions by rotating the vehicle body with the vehicle axle relative to the horizontal. When the vehicle body is fixed to the vehicle axle, the seat device can be rotated relative to the vehicle axle and relative to the passenger compartment such that an orientation of the seat device relative to the horizontal does not change at least substantially. The passenger compartment is fixed to the vehicle axle only for as long as the passenger compartment needs to be moved from a first of the basic positions to a second of the basic positions. If the passenger compartment is in the second of the basic positions, the fixing is reversed and the passenger compartment can be rotated relative to the vehicle axle. By way of example, the passenger compartment can be arranged in exactly two different basic positions. A first basic position is, for example, an at least substantially horizontal orientation of the vehicle body along the longitudinal direction of extension of the passenger compartment, while the second basic position is, for example, an at least substantially vertical orientation of the passenger compartment along the longitudinal direction of extension of the passenger compartment. The passenger compartment can be aligned particularly easily at different angles to the horizontal and thus in different basic positions by means of the at least temporary fixing.

In a further advantageous design of the invention, it is provided that the passenger compartment can be arranged in the respective basic position depending on a position of a vehicle occupant arranged on the seat device. This means that the vehicle occupant can influence in which of the basic positions the passenger compartment is arranged. Here, the passenger compartment is advantageously arranged in the first basic position when the vehicle occupant is sitting on the seat device, whereas the passenger compartment is arranged in the second basic position when the vehicle occupant is standing or wants to stand on the seat device. By way of example, the passenger compartment can be arranged in the respective basic position depending on an input from the vehicle occupant. This input can occur by manual operation of an actuating element or, for example, by shifting the weight of the vehicle occupant.

It has been shown to be further advantageous when a control device is provided, by means of which the position of the vehicle occupant can be detected and by means of which the passenger compartment can be arranged relative to the seat device depending on the detected position. In this case, the control device can receive the input of the vehicle occupant, which is, for example, the weight shift of the vehicle occupant. Alternatively or additionally, the control device can comprise pressure sensors or a camera device by means of which the position of the vehicle occupant within the passenger compartment can be detected. By means of the pressure sensors it may be possible, for example, to detect whether the vehicle occupant is sitting or standing on the seat device. By means of the camera device, the position of the vehicle occupant can be detected and evaluated by an image processing program. By means of the image processing program, it can be determined by images recorded by the camera whether the vehicle occupant is sitting or standing inside the passenger compartment. Depending on the detected position of the vehicle occupant, the control device triggers an arrangement of the passenger compartment in the first basic position or in the second basic position. Here, the control device can trigger the at least temporary fixing of the vehicle body to the vehicle axle for arranging the passenger compartment in one of the two basic positions. In this way, the orientation of the passenger compartment can be adapted to the position of the vehicle occupant particularly easily.

In a further advantageous embodiment of the invention, it is provided that the seat device is rotationally movable relative to the passenger compartment in a driving mode of the motor vehicle and is adjusted in an at least substantially horizontal orientation. In other words, the passenger compartment can be arranged in the different basic positions in the driving mode of the motor vehicle, whereas the seat device is permanently horizontally aligned. This makes it possible to ensure that, at least in the driving mode of the motor vehicle, a head of the vehicle occupant is permanently arranged above a body of the vehicle occupant. This makes is possible for the vehicle occupant to stay in the vehicle in a particularly comfortable position. In addition, it may be possible to tilt the seat device in its position about the axis of rotation in such a way that different positions of the occupant become possible. By way of example, a particularly relaxing "zero-gravity" position can be implemented, in which the knees of the vehicle occupant are at a similar height level to the head of the vehicle occupant.

In another advantageous embodiment of the invention, it is provided that the wheels of the chassis, the passenger compartment and the seat device are at least substantially coaxially displaceable relative to each other. In particular, the motor vehicle here has two wheels, each of which is rotatable about the vehicle axle. The wheels are rotatable coaxially to the passenger compartment and to the seat device. In addition, the electric motors, by means of which the wheels can be driven, can be arranged coaxially to the wheels. Advantageously, this makes it possible to implement a particularly compact construction of the motor vehicle.

It has also proved to be advantageous if wheels which, in any position relative to the vehicle body along a transverse direction of the vehicle, are arranged so as to overlap at least in part with at least one window of the vehicle body, each have an at least partially transparent rim. In other words, the rims of the wheels of the chassis are transparent and therefore translucent, such that the vehicle occupant can see through the window of the vehicle body which overlaps with at least one rim, into surroundings of the motor vehicle. Thus the vehicle occupant can also see out into the surroundings of the motor vehicle through regions of the at least one window of the vehicle body which overlap with a rim of a wheel. This enables the occupant to observe the surroundings of the motor vehicle through all windows of the vehicle body. This creates a particularly high level of comfort for the vehicle occupant. The rims can, for example, be window rims made of a transparent plastic such as polycarbonate.

The wheel diameter is chosen to be large enough to allow for a minimum suspension height, which may be provided by the tires themselves.

The invention further relates to a method for operating a motor vehicle as already described in connection with the motor vehicle in accordance with the invention. In the method, the vehicle body with the passenger compartment and the seat device arranged within the passenger compartment are rotated relative to each other about the axis. In other words, the passenger compartment is rotated relative to the vehicle axle and relative to the seat device, and the seat device is rotated relative to the vehicle axle and relative to the passenger compartment. In a driving mode of the motor vehicle, the vehicle axle is continuously rotated relative to the seat device and relative to the passenger compartment. The passenger compartment can be temporarily fixed relative to the seat device in the driving mode and temporarily fixed to the vehicle axle for moving the passenger compartment from one basic position to another basic position while the seat device is rotated relative to the passenger compartment. This allows the passenger compartment to be held in one of at least two basic positions or to be moved from one basic position to another basic position while the vehicle is in drive mode. In this way, the orientation of the passenger compartment can advantageously be adapted to a position of the vehicle occupant inside the passenger compartment.

In this context, it has been shown to be advantageous for the passenger compartment to be arranged relative to the seat device depending on a position of a vehicle occupant arranged on the seat device. In other words, the position of the vehicle occupant is sensed and the passenger compartment is arranged in one of the basic positions depending on the sensed position of the vehicle occupant. In this way, a particularly high level of comfort can be achieved for the vehicle occupant by arranging the passenger compartment in such a way that the vehicle occupant can assume the respective position particularly comfortably, depending on the detected position of the vehicle occupant.

Further advantages, features and details of the invention arise from the following description of a preferred exemplary embodiment based on the drawings. The features and combinations of features mentioned above in the description as well as the features and combinations of features mentioned below in the Figure descriptions and/or shown in the Figures alone can be used not only in the combination specified in each case, but also in other combinations or on their own without leaving the scope of the invention.

BRIEF DESCRIPTION OF THE DRAWINGS

FIG. 1 is a schematic side view of a motor vehicle with a vehicle body having a passenger compartment, a chassis supporting the vehicle body and a seat device which is arranged inside the passenger compartment, wherein the chassis has only one vehicle axle, about the axis of which the vehicle body with the passenger compartment and the seat device arranged inside the passenger compartment can be rotated relative to each other and relative to the chassis, wherein the passenger compartment is arranged in a first basic position in which a longitudinal direction of extension of the passenger compartment is aligned at least substantially horizontally;

FIG. 2 is a schematic side view of the motor vehicle according to FIG. 1, wherein the passenger compartment is arranged in a second basic position, in which a longitudinal direction of extension of the passenger compartment is at least substantially vertically aligned, such that a vehicle occupant can stay standing inside the passenger compartment;

DETAILED DESCRIPTION OF THE DRAWINGS

Figure 3:
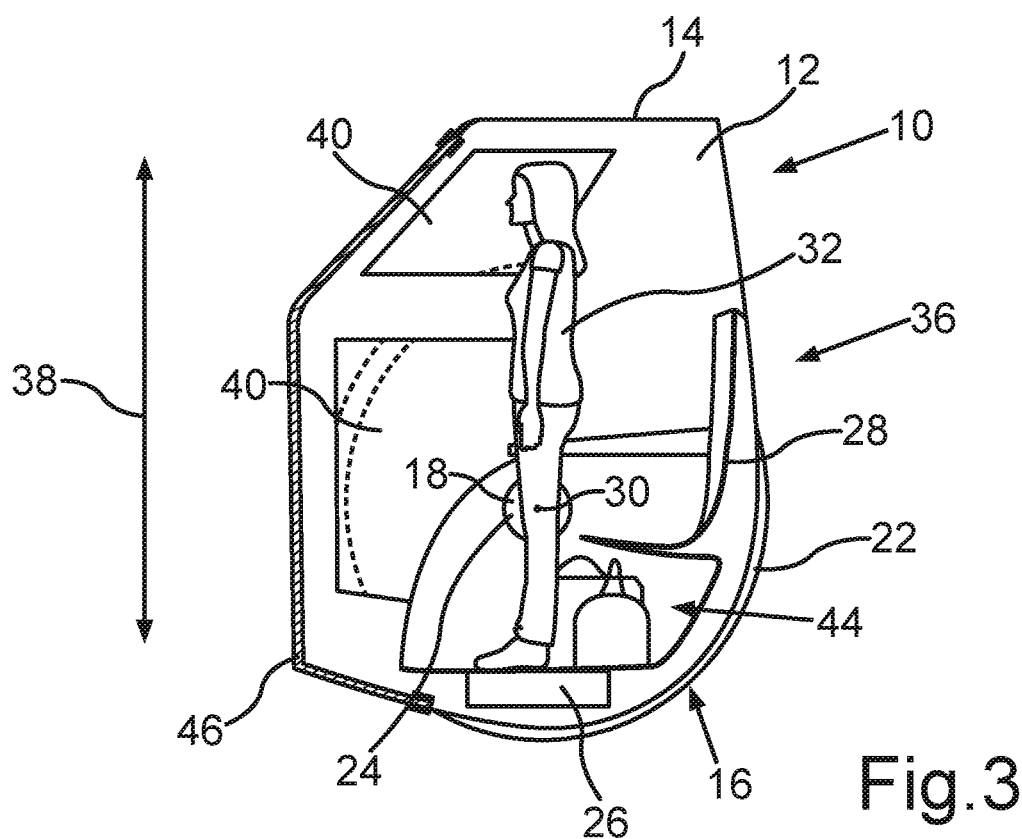
FIG. 3 is a schematic sectional view of the motor vehicle according to FIG. 2, wherein the passenger compartment is arranged in the second basic position and the vehicle occupant is standing on the seat device within the passenger compartment.

In FIG. 1 and FIG. 2, a schematic side view of a motor vehicle 10 with a vehicle body 14 having a passenger compartment 12 is depicted in each case. Furthermore, the motor vehicle 10 comprises a chassis 16 supporting the vehicle body 14, the chassis having a vehicle axle 20 which can be driven by means of a drive device 18. The drive device 18 in the present case has two electric motors 24 which are each connected to a wheel 22. The electric motors 24 can be supplied with energy from an energy storage device 26 designed as a battery. In the present case, the motor vehicle 10, which can be operated in particular autonomously, comprises two wheels 22, which can be driven separately from one another by means of the respective associated electric motors 24 via the vehicle axle 20 for a particularly small turning circle of the motor vehicle 10.

Figure 4:
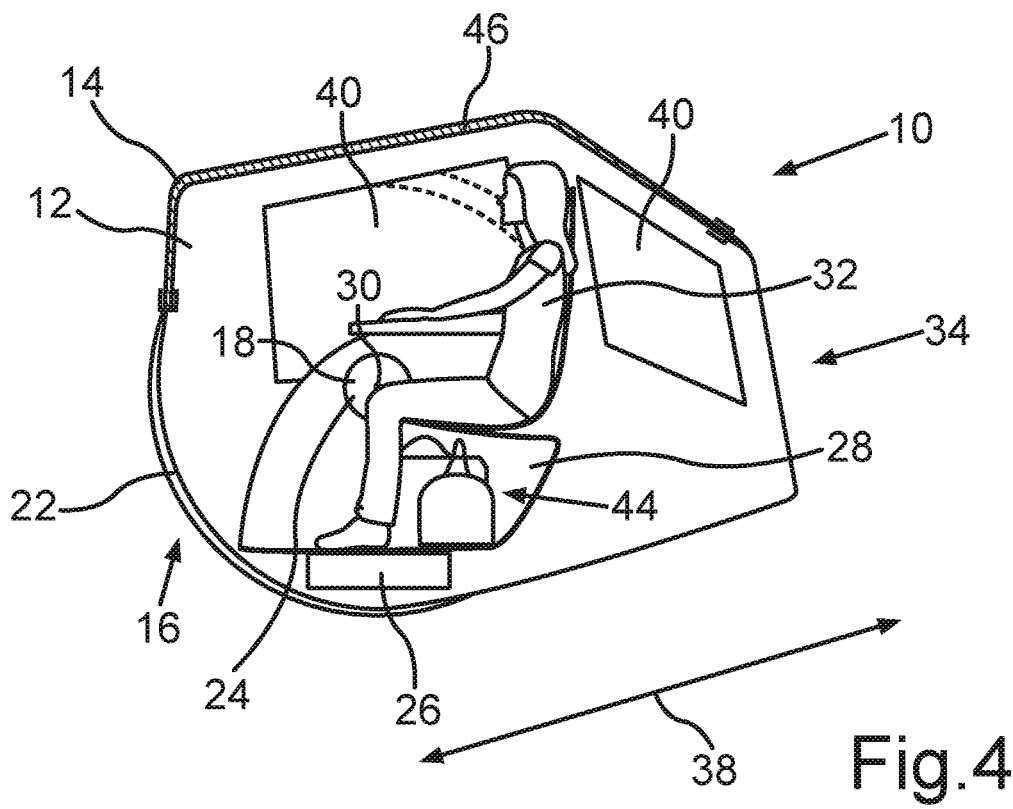
FIG. 4 is a schematic sectional view of the motor vehicle according to FIG. 1, in which the passenger compartment is arranged in the first basic position, in which the longitudinal direction of extension of the passenger compartment is at least substantially horizontally aligned and the vehicle occupant sits on the seat device within the passenger compartment.

As can be seen in the schematic sectional views in FIG. 3 and FIG. 4, the motor vehicle 10 also has a seat device 28, which is arranged inside the passenger compartment 12 and can be rotated about an axis of rotation 30 relative to the passenger compartment 12.

In order to enable a vehicle occupant 32 to stay as comfortably as possible within the passenger compartment 12 of the motor vehicle 10, the chassis 16 supporting the vehicle body 14 has only one vehicle axle 20, about the axis of which the vehicle body 14 with the passenger compartment 12 and the seat device 28 arranged within the passenger compartment 12 can be rotated relative to each other. The axis of the vehicle axle 20 is the axis of rotation 30. In this way, the seat device 28, the passenger compartment 12 and the chassis 16 can each be rotated relative to one another about the axis of rotation 30. The wheels 22 of the chassis 16, the passenger compartment 12 and the seat device 28 can be rotated at least substantially coaxially to each other about the axis of rotation 30, in a driving mode of the motor vehicle 10, the seat device 28 is permanently arranged so as to be rotatably movable relative to the passenger compartment 12 and relative to the chassis 16 in an at least substantially horizontal orientation.

The vehicle occupant 32 can be seated inside the passenger compartment 12 as depicted in FIGS. 1 and 4, or standing as shown in FIGS. 2 and 3. To enable these different positions of the vehicle occupant 32 within the passenger compartment 12, the passenger compartment 12 can be arranged in a first basic position 34 and in a second basic position 36. In the first basic position 34, the passenger compartment 12 is arranged in such a way that a longitudinal extension direction 38 of the passenger compartment 12 runs at least substantially horizontally. In the second basic position 36 depicted in FIGS. 2 and 3, the passenger compartment 12 is arranged in such a way that a longitudinal direction of extension 38 of the passenger compartment 12 runs at least substantially vertically. The passenger compartment 12 can be arranged in the respective basic position 34, 36 depending on a respective position of the vehicle occupant 32. For the adjustment of the passenger compartment 12 in the respective basic position 34, 36, a control device not depicted in the Figures can be provided, by means of which the position of the vehicle occupant 32 can be detected and by means of which the passenger compartment 12 can be arranged relative to the seat device 28 depending on the detected position. The passenger compartment 12 can be arranged in more than the two different depicted basic positions 34, 36 relative to the seat device 28, wherein the different further basic positions each have different angles of incidence of the longitudinal extension direction 38 of the passenger compartment 12 relative to the horizontal.

In order to move the passenger compartment 12 from the first basic position 34 to the second basic position 36, the passenger compartment 12 is at least temporarily fixable together with the vehicle body 14 to the vehicle axle 20, whereby the passenger compartment 12 together with the vehicle axle 20 rotates relative to the seat device 28. In this case, the seat device 28 is continuously horizontally aligned with the vehicle axis 20 during the fixing of the passenger compartment 12 to the vehicle axle 20, while the longitudinal extension direction 38 of the passenger compartment 12 is changed in its alignment to the horizontal. This makes it particularly easy to move the passenger compartment 12 from the first basic position 34 into the second basic position 36. Other changeover mechanisms not described in connection with the Figures are also possible, by means of which the passenger compartment 12 can be changed over between the first basic position 34 and the second basic position 36.

In the present case, the vehicle body 14 has several windows 40. At least one of the windows 40 can be at least partially covered by at least one of the wheels 22 in at least one of the basic positions 34, 36 along the axis of rotation 30. In order to make it possible for the vehicle occupant 32 to see through the respective window 40 into the surroundings of the motor vehicle 10 despite the overlap, the wheels 22 have at least partially translucent rims 42, transparent rims 42 in the present case. The rims 42 are designed as window rims and have a transparent plastic such as polycarbonate.

The motor vehicle 10 enables an autonomous, weather-protected transport of the vehicle occupant 32 with luggage 44 with extreme maneuverability in the smallest of spaces. Here, the vehicle occupant 32 is provided with free movement possibilities, which means that the vehicle occupant 32 can sit or stand or assume a zero-gravity seating position within the passenger compartment 12. The zero-gravity seating position is understood to be an at least substantially lying position in which the knees of the vehicle occupant 32 can be positioned at the height of a heart of the vehicle occupant 32.

In the case of the motor vehicle 10, the seat device 28, the wheels 22 and the passenger compartment 12 are free to rotate relative to each other about the axis of rotation 30, which can additionally be a respective axis of rotation of the electric motors 24. In this way, angular deltas of the seat device 28, the wheels 22 and the passenger compartment 12 can be adjusted relative to each other. Due to the arrangement of the seat device 28, the drive device 18 and the passenger compartment 12 concentrically on the axis of rotation 30, any desired position can be achieved by relative movements to each other, whereby the vehicle occupant 32 can be arranged in a reclining seating position, in a normal seating position or in a standing position by means of the seat device 28. In order to keep the control energy requirement of the motor vehicle 10 low, heavy components such as the energy storage device 26, which is designed as a battery, and the vehicle occupant 32 and the seat device 28 are arranged in the most favourable center of gravity position. A luggage compartment of the seat device 28 for accommodating the luggage 44 is also arranged in a particularly favourable center of gravity position. In the present case, the energy storage device 26 is non-rotatably connected to the seat device 28.

The vehicle occupant 32 can get into the vehicle 10 via a door 46, which is formed as a glass door in the present case. The passenger compartment 12 is arranged in the second basic position 36 when entering the vehicle and is thus vertically aligned along its longitudinal direction of extension 38. This means that the door 46 is also vertically aligned in the present case, such that the vehicle occupant 32 can enter the passenger compartment 12 from the front via the door 46. Both the door 46, which is designed as a glass door, and the windows 40 can be equipped with augmented reality functionalities, which are also referred to as Augmented Reality functionalities. The vehicle occupant 32 can enter the passenger compartment 12 with their head raised while standing. If the vehicle occupant 32 sits on the seat device 28, the passenger compartment 12 follows a movement of the vehicle occupant 32 and moves into the aerodynamically particularly favourable first basic position 34.

The motor vehicle 10, which is autonomously driven, can transport people and/or luggage 44. With the autonomously driving motor vehicle 10, the persons have the possibility to drive the motor vehicle 10 even without a driving license. In this way, any target group can be reached. The possibility for vehicle occupants 32 to stand up at any time has the advantage that the vehicle occupant 32 has freedom of movement, for example to change clothes. In addition, the vehicle occupant 32 can turn to what he or she finds interesting. The transparent rims 42 actively prevent obstruction of vision through the windows 40 due to the wheels 22. In addition, together with augmented reality representations as augmented reality functionalities in the windows 40, what the vehicle occupant 32 is looking at can be actively followed, for example by providing the vehicle occupant 32 with additional information about the surroundings of the motor vehicle 10 by means of the augmented reality representations. Intuitive operation or interaction of the motor vehicle 10 with the vehicle occupant 32 by reacting to their movement can make it particularly easy for the vehicle occupant 32 to become familiar with autonomous driving and can advantageously influence it. The fact that there is only one vehicle axle 20 of the chassis 16 results in a particularly high degree of maneuverability and a particularly small space requirement in an urban environment and also leads to a particularly small mass to be moved compared to standard small vehicle. The possibility of being able to stand or sit is not only useful for the vehicle occupant 32 from an orthopedic and physiological point of view, it also enables the vehicle occupant 32 to interact with his or her surroundings in a particularly advantageous manner.

The invention claimed is:

1. A motor vehicle, comprising:
   a vehicle body with a passenger compartment;
   a chassis which supports the vehicle body; and
   a seat device which is disposed inside the passenger compartment;
   wherein the chassis has only one vehicle axle, wherein the vehicle axle is drivable by a drive device, wherein two wheels of the chassis are coupled to the vehicle axle, and wherein the vehicle body with the passenger compartment and the seat device disposed inside the passenger compartment are rotatable relative to each other about an axis of the vehicle axle.

2. The motor vehicle according to claim 1, wherein the passenger compartment is arrangeable in two different basic positions by at least temporarily fixing the vehicle body to the vehicle axle, while the seat device is rotatably moveable relative to the passenger compartment.

3. The motor vehicle according to claim 1, wherein the passenger compartment is arrangeable in a respective basic position depending on a position of a vehicle occupant arranged on the seat device.

4. The motor vehicle according to claim 3 further comprising a control device, wherein the position of the vehicle occupant is detectable by the control device and wherein the passenger compartment is arrangeable relative to the seat device by the control device depending on a detected position.

5. The motor vehicle according to claim 1, wherein the seat device is rotatably moveable relative to the passenger compartment in a driving mode of the motor vehicle and is set in an at least substantially horizontal orientation.

6. The motor vehicle according to claim 1, wherein the two wheels of the chassis, the passenger compartment and the seat device are at least substantially coaxially displaceable relative to each other.

7. The motor vehicle according to claim 1 wherein the two wheels of the chassis, in every position relative to the vehicle body along a transverse direction of the vehicle, are arranged so as to overlap at least in regions with at least one window of the vehicle body, each of the two wheels of the chassis having an at least partially transparent rim.

8. A method for operating the motor vehicle according to claim 1, comprising the step of rotating the vehicle body with the passenger compartment and the seat device disposed inside the passenger compartment relative to each other about the axis.

9. The method according to claim 8 further comprising the step of arranging the passenger compartment relative to the seat device depending on a position of a vehicle occupant arranged on the seat device.

* * * * *